United States Patent [19]

Saitou et al.

[11] Patent Number: 6,063,493
[45] Date of Patent: May 16, 2000

[54] PRESSURE-SENSITIVE ADHESIVE TAPE

[75] Inventors: Tatsuoki Saitou, Kashima-Gun; Takashi Yamashita, Yokkaichi; Takashi Fukushima; Masaru Nihouda, both of Kurobe, all of Japan

[73] Assignees: Japan Polychem Corporation; Diatex Co., Ltd., both of Tokyo, Japan

[21] Appl. No.: 08/989,331

[22] Filed: Dec. 11, 1997

[30] Foreign Application Priority Data

Dec. 11, 1996 [JP] Japan ..................... 8-331082

[51] Int. Cl.$^7$ ........................................ B32B 7/12
[52] U.S. Cl. ..................... 428/354; 428/332; 428/339; 428/343
[58] Field of Search ................... 428/246, 252, 428/257, 258, 384, 286, 343, 354, 339, 332

[56] References Cited

U.S. PATENT DOCUMENTS

| | | | |
|---|---|---|---|
| 4,304,813 | 12/1981 | Elmore, Jr. | |
| 4,636,627 | 1/1987 | Ohno et al. | 428/246 |
| 5,017,425 | 5/1991 | Sanders | 428/253 |
| 5,108,815 | 4/1992 | Adams et al. | 428/172 |
| 5,112,882 | 5/1992 | Babu et al. | 522/158 |
| 5,209,971 | 5/1993 | Babu et al. | 428/343 |
| 5,246,773 | 9/1993 | Mamish | 428/286 |

FOREIGN PATENT DOCUMENTS

| | | |
|---|---|---|
| 0052363 | 5/1982 | European Pat. Off. . |
| 0451292 | 10/1991 | European Pat. Off. . |

*Primary Examiner*—Merrick Dixon
*Attorney, Agent, or Firm*—Oblon, Spivak, McClelland, Maier & Neustadt, P.C.

[57] ABSTRACT

A pressure-sensitive adhesive tape which is a laminate made up of (1) a woven fabric layer whose warp and weft are thermoplastic-resin-made flat yarns, (2) a layer of polyethylene having a density (D) of 0.875 to 0.917 kg/cm$^3$ and an MFR of 1 to 25 g/10 min, laminated to one surface or both surfaces of the woven fabric layer, and (3) a pressure-sensitive adhesive layer laminated to the polyethylene layer (2), wherein the laminate fulfills the following relationship:

$$W \leq -0.03T + 2.4$$

in which T represents the thickness ($\mu$m) of the polyethylene layer, and W represents the tear strength (kg) of the pressure-sensitive adhesive tape in the crosswise direction thereof, wherein the pressure-sensitive adhesive tape can be cut by hand in the direction rectangular to the longer direction of the tape.

3 Claims, No Drawings

PRESSURE-SENSITIVE ADHESIVE TAPE

BACKGROUND OF THE INVENTION

1. Field of the Invention

The present invention relates to a pressure-sensitive adhesive tape which comprises a supporting fabric woven of thermoplastic-synthetic-resin-made flat yarn, and a pressure-sensitive adhesive applied to the supporting fabric, which can be cut by-hand in the direction rectangular to the longer direction of the tape, that is, in the warp direction, and which is useful, for example, for sealing packaging materials and for binding construction materials to be cured.

2. Background Art

The use of pressure-sensitive adhesive tapes whose supports are flat-yarn-woven fabrics is extending in the field of packaging including the sealing of packaging materials and the binding of construction materials to be cured. However, the conventional pressure-sensitive adhesive tapes have such an inconvenience that a cutter or the like is needed to cut the tapes. In order to obviate this inconvenience, the tear properties of the tapes in the crosswise direction thereof were improved while the strength of the tapes in the lengthwise direction thereof was maintained high. As a result, it became possible to tear the tapes easily by hand. Thus, the use of the pressure-sensitive adhesive tapes is further extending rapidly.

As means for improving the tear properties of the pressure-sensitive adhesive tapes in the crosswise direction thereof without decreasing the strength of the tapes in the lengthwise direction thereof, the following methods have been proposed so far: a method in which weft yarn whose fineness shown in deniers is lower than that of warp yarn is used, and, at the same time, the thread count of weft yarn is made high (Japanese Patent Laid-Open Publication No. 118483/1986); a method in which a resin having a low heat-softening point and a low crystallinity is incorporated into weft yarn, and the weft yarn is allowed to deteriorate by heat applied thereto during the process of lamination; and a method in which weft yarn having a draw ratio lower than that of warp yarn is used (Japanese Utility Model Publication No. 30362/1975).

It is certain that pressure-sensitive adhesive tapes obtained by the above methods have lowered tear resistance in the crosswise direction of the tapes and that it becomes easier to cut the woven fabric layers of the tapes. However, excellent tear properties cannot be obtained unless the adhesive strength of the thermoplastic resin laminated is sufficiently high. It is therefore necessary to make the lamination layer thick. This is uneconomical, and tapes having thick lamination layers have impaired flexibility.

Further, even when high-pressure low-density polyethylene resins, which are the lowest in rigidity among thermoplastic resins usually used for lamination, are laminated, the resulting tapes are insufficient in flexibility.

An object of the present invention is to provide a pressure-sensitive adhesive tape which is so excellent in tear properties in the crosswise direction that the tape can be easily torn by hand and which is so flexible that the tape can be applied even to curved surfaces or to projected portions.

SUMMARY OF THE INVENTION

It has now been found that the above object can be achieved by laminating a layer of a linear low-density polyethylene having specific physical properties to one surface or both surfaces of a woven fabric layer of thermoplastic-resin-made flat yarn. By laminating such a polyethylene layer to the woven fabric, good adhesion can be attained between the polyethylene layer and the woven fabric; excellent tear properties can be obtained even when the lamination layer is thin; and a thin and highly flexible pressure-sensitive adhesive tape can be obtained because the rigidity of the low-density resin itself is low.

Thus, the present invention provides a pressure-sensitive adhesive tape which is a laminate comprising (1) a woven fabric layer whose warp and weft are thermoplastic-resin-made flat yarns, (2) a layer of polyethylene having a density (D) of 0.875 to 0.917 kg/cm$^3$ and an MFR of 1 to 25 g/10 min, laminated to one surface or both surfaces of the woven fabric layer, and (3) a pressure-sensitive adhesive layer laminated to the polyethylene layer (2), wherein the laminate fulfills the following relationship:

$$W \leq -0.03T + 2.4$$

in which T represents the thickness ($\mu$m) of the polyethylene layer, and W represents the tear strength (kg) of the pressure-sensitive adhesive tape in the crosswise direction thereof.

DETAILED DESCRIPTION OF THE INVENTION

[I] Pressure-Sensitive Adhesive Tape (Laminate)

The pressure-sensitive adhesive tape of the present invention is a laminate comprising (1) a woven fabric layer whose warp and weft are thermoplastic-resin-made flat yarns, (2) a layer of polyethylene having a density (D) of 0.875 to 0.917 kg/cm$^3$ and an MFR (melt flow rate) of 1 to 25 g/10 min, laminated to one surface or both surfaces of the woven fabric layer, and (3) a pressure-sensitive adhesive layer laminated to the polyethylene layer (2), wherein the tear strength of the laminate fulfills the following relationship:

$$W \leq -0.03T + 2.4,$$

preferably $W \leq -0.03T + 2.2$, more preferably $W \leq -0.03T + 2.0$, in which T represents the thickness ($\mu$m) of the polyethylene layer, and W represents the tear strength (kg) of the pressure-sensitive adhesive tape in the crosswise direction thereof.

The thickness (T, $\mu$m) of the polyethylene layer (2) as used herein is the thickness of the polyethylene layer laminated to one surface of the woven fabric layer (1), or that of thinner one of the polyethylene layers laminated to both surfaces of the woven fabric layer (1). When the value of W exceeds the above-described range, the tear strength of the pressure-sensitive adhesive tape becomes too high. The pressure-sensitive adhesive tape thus loses its commercial value.

[II] Layer Structure

(1) Woven Fabric Layer (1)

Examples of thermoplastic resins that can be suitably used as materials for the above-described flat yarns include polyolefin synthetic resins which are homopolymers or copolymers of alpha-olefins, for example, polypropylene and polyethylene, polyvinyl chloride synthetic resins, polyvinylidene chloride synthetic resins and polyethylene terephthalate synthetic resins.

A film of any of these thermoplastic resins is slitted, and the slit film is drawn to 2 to 10 times to obtain flat yarn. There is no particular limitation on the fineness and width of the flat yarn. It is however suitable to use, as the weft yarn of the woven fabric, yarn having a fineness of 60 to 150 deniers, preferably 80 to 120 deniers, and a width of 0.4 to 1.1 mm, preferably 0.6 to 0.9 mm.

Further, it is suitable to use, as the warp yarn of the woven fabric, yarn having a fineness of 180 to 380 deniers, preferably 250 to 310 deniers, and a width of 1.0 to 1.5 mm, preferably 1.1 to 1.3 mm. It is proper that the thread count of the weft be from 25 to 50 per inch, preferably 30 to 46 per inch and that the thread count of the warp be from 12 to 25 per inch, preferably from 14 to 20 per inch.

Furthermore, it is preferable that the flat yarn for use as the warp of the woven fabric be drawn to a fineness (deniers) 2.0 to 4.5 times the fineness (deniers) of the weft. By doing so, it becomes easier to cut the pressure-sensitive adhesive tape by hand in the crosswise direction thereof.

(2) Polyethylene Layer (2)

The polyethylene layer (2) is formed by using a polyethylene resin having a density (D) of 0.875 to 0.917 g/cm$^3$, preferably 0.880 to 0.910 g/cm$^3$, and an MFR of 1 to 25 g/10 min, preferably 2 to 20 g/10 min.

The polyethylene resin as used herein means not only ethylene homopolymer but also copolymer resins of ethylene with other olefins, preferably alpha-olefins having 3 to 18 carbon atoms.

When the polyethylene resin has a density (D) lower than the above-described range, the polyethylene layer becomes very sticky, so that the resulting pressure-sensitive adhesive tape has no commercial value. On the other hand, when the polyethylene resin has a density (D) higher than the above-described range, the polyethylene layer has impaired flexibility.

When the MFR of the polyethylene resin is made lower than the above-described range, the spreading properties of the resin become worse, so that the processability of the resin on lamination becomes worse. On the other hand, when the MFR of the polyethylene resin is made higher than the above-described range, neck-in is greatly caused during the process of lamination. As a result, a loss is increased, and the edge of the polyethylene layer becomes thick. The processability of such a polyethylene resin is thus poor.

It is preferable that the polyethylene layer (2) be made from a composition comprising the following components (A) and (B).

(A) Component A (Copolymer of Ethylene with Alpha-Olefin Having 3 to 18 Carbon Atoms)

(a) Properties

It is preferable to use, as Component A, a copolymer of ethylene with an alpha-olefin having 3 to 18 carbon atoms, having the following physical properties <1> and <2>, preferably <1> to <3>, particularly <1> to <4>.

<1> MFR

As the above-described copolymer of ethylene with an alpha-olefin having 3 to 18 carbon atoms, a copolymer having an MFR determined in accordance with JIS-K7210 of 0.1 to 100 g/10 min, especially 1.0 to 20 g/10 min is preferably used.

When the copolymer has an MFR higher than the above-described range, it shows impaired melt elasticity. When such a copolymer is subjected to extrusion lamination, neck-in is greatly caused, and the edge of the lamination layer becomes thick. The copolymer thus shows poor processability. Moreover, the strength of the copolymer itself is also insufficient. On the other hand, when the copolymer has an MFR lower than the above-described range, the resin pressure becomes high. As a result, the copolymer shows impaired extrusion properties, and, at the same time, shows poor spreading properties when subjected to extrusion lamination.

<2> Density

The above-described copolymer of ethylene with an alpha-olefin having 3 to 18 carbon atoms preferably has a density determined in accordance with JIS-K7112 of 0.870 to 0.915 g/cm$^3$, more preferably 0.870 to 0.910 g/cm$^3$.

When the density of the copolymer is made higher than the above-described range, the copolymer becomes poor in both flexibility and transparency. On the other hand, when the density of the copolymer is made lower than the above-described range, the copolymer becomes poor in heat resistance, and imparts stickiness to the surface of the resulting tape.

<3> Q Value

It is preferable that the Q value (weight-average molecular weight/number-average molecular weight) of the above-described copolymer of ethylene with an alpha-olefin having 3 to 18 carbon atoms, determined by size exclusion chromatography (SEC) be from 1.5 to 4.0, especially from 1.8 to 3.0.

When the Q value of the copolymer is greater than the above-described range, the resulting tape tends to have decreased strength. On the other hand, when the copolymer has a Q value smaller than the above-described range, it shows impaired melt elasticity. Therefore, neck-in is greatly caused when the copolymer is subjected to extrusion lamination, and the edge of the lamination layer becomes thick. The processability of such a copolymer is thus poor.

<4> Extrapolated Melting-Termination Temperature (Tem) Determined by Differential Scanning Calorimetry (DSC)

The copolymer of ethylene with an alpha-olefin having 3 to 18 carbon atoms for use in the present invention preferably has an extrapolated melting-termination temperature (Tem) ranging from 55 to 115° C., more preferably from 70 to 110° C., and this temperature (Tem) and the density (D) of the copolymer preferably fulfill the relationship of Tem≦286D−137, more preferably Tem≦429D−271, most preferably Tem≦57D−404. The extrapolated melting-termination temperature (Tem) is a temperature at the intersection of the straight line drawn by extending the base line on the high-temperature side of a DSC curve obtained in accordance with JIS-K7121 to the low-temperature side, and the tangent line drawn to the curve on the high-temperature side of a melting peak at the point of maximum gradient. On the melting curve, some peaks may appear at temperatures other than the melting temperature at which the above peak appears. However, these peaks are very small, so that they are not regarded as peaks.

In the case where the copolymer has no peak on the above-described differential melting curve, the copolymer layer shows stickiness after laminated to the woven fabric. For this reason, the supporting fabric tends to be broken when the fabric laminated with the copolymer layer is delivered during the process of the application of a pressure-sensitive adhesive. On the other hand, when the copolymer has two or more peaks on the above-described differential melting curve, the resulting tape is poor in both strength and transparency.

When the extrapolated melting-termination temperature (Tem) of the copolymer is lower than the aforementioned range, blocking tends to be caused in the resulting tape. On the other hand, when the Tem of the copolymer is higher than the aforementioned range, the resulting tape is poor in flexibility, strength and transparency.

Further, when the Tem of the copolymer does not fulfill the above-described relationship, the resulting tape is poor in flexibility, strength and transparency.

(b) Composition

Alpha-olefins that can be used for producing the copolymer of ethylene with an alpha-olefin having 3 to 18 carbon atoms, Component A in the present invention, are alpha-olefins having 3 to 18 carbon atoms, specifically propylene, 1-butene, 1-pentene, 1-hexene, 1-octene, 1-heptene, 4-methyl-pentene-1, 4-methyl-hexene-1, 4,4-dimethyl-pentene-1, and the like. Of these alpha-olefins, those having 4 to 10 carbon atoms are preferably used either singly or in combination of two or more.

It is preferable to copolymerize 2 to 50% by weight, preferably 5 to 40% by weight of such an alpha-olefin with 98 to 50% by weight, preferably 95 to 60% by weight of ethylene.

(c) Production

<1> Catalyst

As processes for producing the copolymer of ethylene with an alpha-olefin having 3 to 18 carbon atoms, Component A in the present invention, there can be mentioned processes as described in Japanese Patent Laid-Open Publications No. 19309/1983, No. 95292/1984, No. 35005/1985, No. 35006/1985, No. 35007/1985, No. 35008/1985, No. 35009/1985, No. 130314/1986 and No. 163088/1991, European Patent Application No. 420,436, U.S. Patent No. 5,055,438, and International Patent Laid-Open Publication WO 91/04257, that is, processes in which ethylene, main component, is copolymerized with an alpha-olefin having 3 to 18 carbon atoms, secondary component, by the use of a metallocene catalyst, a metallocene/alumoxane catalyst, or a catalyst as described, for example, in International Patent Laid-Open Publication WO 92/07123, composed of a metallocene compound, and a compound which can be stable ions when reacted with a metallocene catalyst which will be described later.

Metallocene Compound

The above-described metallocene compound is an organic metal compound composed of an unsubstituted or substituted cyclopentadienyl ligand, or a cyclopentadienyl ligand on which substituents are combined to form a fused ring, and a transition metal belonging to group IVb of the long-form periodic table. Those compounds which are represented by the following general formula [1] are preferred as the metallocene compound:

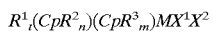

$$R^1_t(CpR^2_n)(CpR^3_m)MX^1X^2 \quad [1]$$

wherein Cp represents cyclopentadienyl group; $R^1$ represents a covalent crosslinking group containing an element belonging to group IVb of the long-form periodic table, such as carbon, silicon or germanium; t is 0 or 1; $R^2$ and $R^3$ represent a halogen, a silicon-containing group, a hydrocarbon group having 1 to 20 carbon atoms, a halogen-containing hydrocarbon group having 1 to 20 carbon atoms, an alkoxy group, an aryloxy group, or an amino group, provided that when two adjacent $R^2$s or $R^3$s are present on the cyclopentadienyl ring, they may be combined with each other to form a $C_4$–$C_8$ ring; m and n are an integer of 0 to 5, provided that 1+m=5 and that 1+n=5; M represents a transition metal belonging to group IV of the long-form periodic table; and $X^1$ and $X^2$ represent a halogen atom, hydrogen atom, a hydrocarbon group having 1 to 20 carbon atoms, an alkoxy group, an aryloxy group or amide group.

As the transition metal, titanium, zirconium and hafnium are preferred.

A compound which can be stable ions when reacted with a metallocene catalyst is an ionic compound composed of an ion pair of cation and-anion, or an electrophilic compound which will be stable ions when reacted with a metallocene compound to form polymerizable species.

Ionic Compound

The above-described ionic compound is represented by the following general formula [2]:

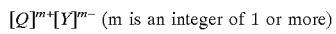

$$[Q]^{m+}[Y]^{m-} \text{ (m is an integer of 1 or more)} \quad [2].$$

In the above formula, Q represents the cationic component of an ionic compound. Examples of the cationic component represented by Q include carbonium cation, tropylium cation, ammonium cation, oxonium cation, sulfonium cation and phosphonium cation. In addition, cations of metals which are readily reduced, and those of organic metals can also be mentioned.

These cations are not only cations which can provide protons as disclosed in Japanese Patent Laid-Open Publication No. 501950/1989, but also cations which do not provide protons. Specific examples of these cations include triphenylcarbonium, diphenylcarbonium, cycloheptatrienylium, indenium, triethylammonium, tripropylammonium, tributylammonium, N,N-dimethylammonium, dipropylammonium, dicyclohexylammonium, triphenylphosphonium, trimethylphosphonium, tri(dimethyl-phenyl)phosphonium, tri(methylphenyl)phosphonium, triphenylsulfonium, triphenyloxonium, triethyloxonium, pyrylium, silver ion, gold ion, platinum ion, palladium ion, mercury ion and ferrocenium ion.

In the above formula, Y represents the anionic component of an ionic compound, which can be stable anions when reacted with a metallocene compound. Examples of such an anionic component include organic boron compound anions, organic aluminum compound anions, organic gallium compound anions, organic phosphorus compound anions, organic arsenic compound anions, and organic antimony compound anions. Specifically, there can be mentioned tetraphenylboron, tetrakis(3,4,5-trifluorophenyl)boron, tetrakis(3,5-di(trifluoromethyl)phenyl)-boron, tetrakis(3,5-(t-butyl)phenyl)boron, tetrakis(penta-fluorophenyl)boron, tetraphenylaluminum, tetrakis(3,4,5-trifluorophenyl) aluminum, tetrakis(3,5-di(trifluoromethyl)-phenyl) aluminum, tetrakis(3,5-di(t-butyl)phenyl)aluminum, tetrakis (pentafluorophenyl)aluminum, tetraphenylgallium, tetrakis (3,4,5-trifluorophenyl)gallium, tetrakis(3,5-di-(trifluoromethyl)phenyl)gallium, tetrakis(3,5-di(t-butyl)-phenyl)gallium, tetrakis(pentafluorophenyl)gallium, tetraphenylphosphorus, tetrakis(pentafluorophenyl) phosphorus, tetraphenylarsenic, tetrakis(pentafluorophenyl) arsenic, tetraphenylantimony, tetrakis(pentafluorophenyl) antimony, decaborate, undecaborate, carbadodecaborate and decachlorodecaborate.

Electrophilic Compound

The electrophilic compound includes, among compounds known as Lewis acid compounds, those ones which become stable ions when reacted with metallocene compounds to form polymerizable species. Examples of such compounds include various metallic halides, and metallic oxides known as solid acids. Specifically, there can be mentioned magnesium halides and Lewis acid inorganic compounds.

Without using the above-described metallocene catalysts, it is quite difficult to obtain copolymers of ethylene with alpha-olefins having 3 to 18 carbon atoms, having the aforementioned properties of Component A, and to obtain the effects of the present invention.

<2> Polymerization Process

Examples of processes that can be employed for the copolymerization of ethylene with an alpha-olefin having 3 to 18 carbon atoms include gas phase polymerization process, slurry polymerization process, solution polymerization process, and high-pressure ion polymerization process. Of these, solution polymerization process and high-pressure ion polymerization process are preferred. High-pressure ion polymerization process is particularly preferred because copolymers produced by this process can greatly show the effects of the present invention.

It is noted that this high-pressure ion polymerization process is a process described in Japanese Patent Laid-Open Publication No. 18607/1981 or No. 225106/1983.

Specifically, the high-pressure ion polymerization process is a process for producing ethylene polymers, which is conducted under the following reaction conditions: the pressure is 100 kg/cm$^2$ or higher, preferably 300 to 2,000 kg/cm$^2$; and the temperature is 125° C. or higher, preferably between 130° C. and 250° C., particularly between 150° C. and 200° C.

(B) Component B (High-Pressure Low-Density Polyethylene)

(a) Properties

High-pressure low-density polyethylene having the following physical properties <1> and <2>, particularly <1> to <3> is used as Component B of the polyethylene layer (2) of the present invention.

<1> MFR

The high-pressure low-density polyethylene for use in the present invention preferably has an MFR (melt flow rate) determined in accordance with JIS-K7210 of 0.1 to 50 g/10 min, more preferably 2 to 25 g/10 min.

When the polyethylene has an MFR higher than the above-described range, it shows impaired melt elasticity. When such polyethylene is subjected to extrusion lamination, neck-in is greatly caused, and the edge of the lamination layer becomes thick. The processability of the polyethylene is thus poor. On the other hand, when the polyethylene has an MFR lower than the above-described range, the resin pressure becomes high. Therefore, the polyethylene shows impaired extrusion properties, and, at the same time, shows poor spreading properties when subjected to extrusion lamination.

<2> Density

The high-pressure low-density polyethylene for use in the present invention preferably has a density determined in accordance with JIS-K7112 of 0.915 to 0.940 g/cm$^3$, more preferably 0.916 to 0.925 g/cm$^3$.

When the density of the polyethylene is higher than the above-described range, the polyethylene layer has high rigidity, so that the resulting pressure-sensitive adhesive tape is poor in flexibility. On the other hand, when the density of the polyethylene is lower than the above-described range, the resulting tape is to have a sticky surface.

<3> Q Value

It is preferable that the Q value (weight-average molecular weight/number-average molecular weight) of the high-pressure low-density polyethylene for use in the present invention, determined by size exclusion chromatography (SEC) be from 5 to 30, preferably from 7 to 20.

When the Q value of the polyethylene is greater than the above-described range, the resulting tape tends to have poor appearance. On the other hand, when the Q value of the polyethylene is smaller than the above-described range, the polyethylene has low melt elasticity. Therefore, neck-in is greatly caused when the polyethylene is subjected to extrusion lamination, and the edge of the lamination layer becomes thick. The processability of the polyethylene is thus poor.

(b) Specific Examples of High-Pressure Low-Density Polyethylene

The aforementioned high-pressure low-density polyethylene can be properly selected from commercially available ones. It is particularly preferable to use polyethylene produced by the autoclave process, at a reaction temperature of 220° C. or higher, preferably between 250° C. and 350° C., under a reaction pressure of 1,700 kg/cm$^2$ or lower, preferably from 1,200 to 1,600 kg/cm$^2$.

(c) Preparation of Resin Composition for Forming Polyethylene Layer (2)

A resin composition for forming the polyethylene layer (2), comprising Component A (a copolymer of ethylene with an alpha-olefin having 3 to 18 carbon. atoms), and Component B (high-pressure low-density polyethylene) can be prepared by blending Component A with Component B in the same manner as in the preparation of ordinary resin compositions. Specifically, Component A and Component B are dry-blended in advance, and the blend is introduced as it is into the hopper of a film-forming apparatus. Alternatively, the blend is melted and kneaded, in general, at a temperature of 130 to 250° C. by a Brabender Plastograph, a Banbury mixer, a kneader blender, or the like, and then pelletized by an ordinary method, thereby producing a tape.

Blend Ratio

A copolymer of ethylene with an alpha-olefin having 3 to 18 carbon atoms (Component A) is blended with high-pressure low-density polyethylene (Component B) so that the blend ratio of the copolymer to the polyethylene will preferably be 20–99% by weight to 80–1% by weight, more preferably 30–95% by weight to 70–5% by weight.

When the proportion of Component B is made greater than the above-described range, the adhesion strength between the woven fabric layer (1) and the polyethylene layer (2) is decreased, and the resulting tape has impaired tear properties and low flexibility. On the other hand, when the proportion of Component B is smaller than the above-described range, the polyethylene layer (2) cannot be stably formed.

(D) Other Components (Optional Components)

Various additives usually used for resin compositions may also be incorporated into a mixture of Component A and Component B of the present invention. Examples of additives that can be used include antioxidants (particularly preferred are phenolic antioxidants and phosphorus antioxidants), anti-blocking agents, slip agents, thermal stabilizers, ultraviolet absorbers, neutralizers, anticlouding agents and colorants.

(3) Pressure-Sensitive Adhesive Layer (3)

Those pressure-sensitive adhesives which are usually used for producing conventional pressure-sensitive adhesive tapes can be used for forming the pressure-sensitive adhesive layer (3) of the present invention. Examples of pressure-sensitive adhesives that can be used in the present invention include rubber pressure-sensitive adhesives (natural rubber, polyisoprene rubber, styrene-butadiene rubber, SIS-, SBS- or SEBS-block rubber, butyl rubber, polyisobutylene rubber, reclaimed rubber), acrylic pressure-sensitive adhesives and silicone pressure-sensitive adhesives.

(4) Optional Layer (Fourth Layer)

Besides the above-described essential layers (1), (2) and (3), a fourth layer may also be provided as an optional layer.

To form the fourth layer, it is possible to use an golefin resin such as high-pressure low-density polyethylene (HP-LDPE), linear low-density polyethylene (LLDPE), high-density polyethylene (HDPE), an ethylene-vinyl acetate copolymer, an ethylene-(meth)acrylic acid copolymer, or an ethylene-(meth)acrylate copolymer.

[III] Production of Pressure-Sensitive Adhesive Tape

A pressure-sensitive adhesive tape of the present invention can be produced by coating a pressure-sensitive adhesive layer (3) onto a laminate of a flat-yarn-woven fabric layer (1) and a polyethylene layer (2), obtained by laminating, by means of extrusion lamination, a resin composition for forming the polyethylene layer (2) to the flat-yarn-woven fabric layer (1) serving as a support.

A dry blend of Component A and Component B can be used as it is as the resin composition for forming the polyethylene layer (2). Alternatively, the dry blend which is melted and kneaded, and then pelletized can also be used as a material to be laminated by the above-described extrusion lamination.

[IV] Layer Structure

A pressure-sensitive adhesive tape of the present invention is produced by forming a pressure-sensitive adhesive layer (3) on one surface of a laminate composed of a woven fabric layer (1) whose warp and weft are thermoplastic-resin-made flat yarns, and a polyethylene layer (2) formed by using a resin composition comprising Component A and Component B, provided on one surface or both surfaces of the woven fabric layer (1).

The pressure-sensitive adhesive tape is therefore a laminate having the following layer structure:

layer (1)/layer (2)/layer (3), layer (3)/layer (1)/layer (2), layer (2)/layer (1)/layer (2)/layer (3), fourth layer/layer (1)/layer (2)/layer (3), layer (2)/layer (1)/fourth layer/layer (3), etc.

There are no particular limitation on the fineness (deniers) and thread count of the warp and weft yarns of the woven fabric layer (1), and they are decided depending upon the qualities required, such as the tensile strength and tensile elongation of the pressure-sensitive adhesive tape.

The thickness of the polyethylene layer (2) is from 5 to 70 μm, preferably from 20 to 50 μm.

When the thickness of the polyethylene layer (2) is greater than the above-described range, the pressure-sensitive adhesive tape shows impaired flexibility. On the other hand, when the thickness of the polyethylene layer (2) is smaller than the above-described range, the adhesive strength between the woven fabric layer (1) and the polyethylene layer (2) is poor, and the pressure-sensitive adhesive tape shows impaired tear properties.

Further, there is no particular limitation on the amount of a pressure-sensitive adhesive to be coated to form the pressure-sensitive adhesive layer (3), and this amount is decided depending upon the pressure-sensitive adhesiveness required. In general, however, the amount (solid matter) is from 20 to 60 g/m$^2$.

The thickness of the fourth layer is generally from 5 to 70 μm, preferably from 20 to 50 μm.

EXAMPLES

The present invention will now be explained more specifically by referring to the following Experimental Examples including Examples and Comparative Examples. The physical properties of the films and those of the pressure-sensitive adhesive tapes produced in these Examples and Comparative Examples were evaluated by the following methods.

[I] Methods for Evaluating Physical Properties of Films (1) MFR:

Measured in accordance with JIS-K7210 (at 190° C. under a load of 2.16 kg).

(2) Density:

Measured in accordance with JIS-K7112.

(3) Extrapolated Melting-Termination Temperature (Tem) Determined by Differential Scanning Calorimetry (DSC):

Approximately 5 mg of a test specimen taken out of a film having a thickness of 100 μm formed by a heat press was weighed, and set in a DSC (type "RDC 220" manufactured by Seiko Instruments Inc., Japan). The test specimen was heated to 170° C., and maintained at the temperature for 5 minutes. Thereafter, it was cooled to −10° C. at a cooling rate of 10° C./min, maintained at the temperature for 1 minute, and then heated again to 170° C. at a heating rate of 10° C./min. Thus, a DSC curve (temperature: −10° C. to 170° C.) was obtained. The extrapolated melting-termination temperature (Tem) was determined in accordance with JIS-K7121, by reading a temperature at the intersection of the straight line drawn by extending the base line on the high-temperature side of the DSC curve to the low- temperature side, and the tangent line drawn to the curve on the high-temperature side of the melting peak at the point of maximum gradient.

[II] Methods for Evaluating Physical Properties of Pressure-Sensitive Adhesive Tapes (1) Heat-Sealing Strength A test tape before coated with a pressure-sensitive adhesive was cut into test specimens, each having a width of 15 mm. Two of these test specimens were superposed so that the pressure-sensitive-adhesive-coating surfaces thereof would face each other, and heat-sealed by a hot plate heat sealer manufactured by Toyo Seiki Seisakusho, Ltd., Japan. At this time, the sealing temperature was 160° C., the sealing pressure was 2 kg/cm$^2$, and the sealing time was 1 second. The heat-sealing strength of this sample obtained was measured by a tensile strength tester by peeling the specimens at an angle of 180 (T-peel) at a rate of 500 mm/min.

(2) Tensile Strength & Tensile Elongation

Measured in accordance with JIS-L1096, Method A (stripping method) for measuring tensile strength and tensile elongation.

(3) Tear Strength

Measured in accordance with JIS-L1096, Method A-1 (single tang method) for measuring tear strength. A test specimen was torn over a length of 50 mm, and the tear strength was taken as a mean value of three maximum values and three minimum values.

In order to obtain a practical tear strength, the measurement was carried out at a stress rate of 600 mm/min.

(4) Bending Resistance

Measured in accordance with JIS-L1096, Method A (45 cantilever method) for measuring bending resistance.

(5) Processability (Film-Forming Stability at the Time of Extrusion Lamination)

The processability at an extrusion lamination speed of 100 m/min, the current processing speed for commercial production, and the processability at a slower extrusion lamination speed of 20 m/min, the production cost required for this speed being slightly higher than that for the above speed, were evaluated.

O: good; X: poor (6) Anti-Blocking Properties

Evaluated by the degree of blocking caused in a roll of a tape before coated with a pressure-sensitive adhesive.

O: good; X: poor

[III] Experimental Examples (1) Preparation of Component A (Copolymer of Ethylene with Alpha-Olefin Having 3 to 18 Carbon Atoms)

A catalyst was prepared by the method described in Japanese Patent Laid-Open Publication No. 130314/1986. Namely, to 2.0 mmol of ethylene-bis(4,5,6-tetrahydroindenyl)zirconium dichloride complex, methyl alumoxane manufactured by Toyo Stauffer Co., Ltd., Japan was added in an amount of 1,000 mol times the amount of the above complex. The mixture was diluted with toluene to 10 litters to obtain a catalyst solution. By the use of this catalyst solution, polymerization was carried out in the following manner.

To an agitated autoclave-type continuous reactor having an internal volume of 1.5 litters, ethylene and 1-hexene were fed so that the ratio of ethylene to 1-hexene would be 100% by weight to 50–300% by weight. The internal pressure of the reactor was maintained at 1,300 to 1,600 kg/cm$^2$, and the two components were reacted with each other at a temperature of 100 to 250° C.

By this reaction, an ethylene/1-hexene copolymer having an MFR of 0.1 to 100 g/10 min and a density of 0.870 to 0.915 g/cm$^3$ was obtained. The extrapolated melting-termination temperature (Tem) of this copolymer, determined by differential scanning calorimetry (DSC) was from 55 to 115° C.

To this copolymer were added proper amounts of "Irganox 1076" (manufactured by CIBA-GEIGY AG) and "P-EPQ" (manufactured by Sandoz K. K., Japan) as antioxidants, talc (manufactured by Fuji Talc Industrial Co., Ltd., Japan) as an anti-blocking agent, and erucic amide (manufactured by Nippon Fine Chemical Co., Ltd., Japan) as a slip agent. Thus, a copolymer composition was prepared.

(2) Preparation of Component B (High-Pressure Low-Density Polyethylene)

Reaction was carried out by the autoclave process, at a temperature of 150 to 350° C. under a pressure of 1,000 to 2,000 kg/cm$^2$ to obtain high-pressure low-density polyethylene having an MFR of 0.1 to 50 g/10 min and a density of 0.916 to 0.940 g/cm$^3$.

(3) Preparation of Resin Composition for Forming Polyethylene Layer (2)

The above-prepared Component A and Component B were dry-blended according to a predetermined ratio. The blend was granulated by a single-screw extruder having a diameter of 40 mm at a temperature of 160° C. A resin composition in the form of pellet, consisting of Component A and Component B was thus obtained.

(4) Production of Pressure-Sensitive Adhesive Tape

The above-prepared resin composition consisting of Component A and Component B was heated to 310° C., and extruded from a T-die having a width of 500 mm to form a melt thin film (polyethylene layer (2)) on one surface or both surfaces of a flat-yarn-woven fabric layer (1) whose weft was 98 denier high-density-polyethylene-made yarn and whose warp was 280 denier high-density-polyethylene-made yarn, the thread count of the weft yarn being 46 per inch, and that of the warp yarn being 16 per inch. The polyethylene layer (2) and the flat-yarn-woven fabric layer (1) were then pressure-laminated to each other. The pressure-sensitive-adhesive-coating surface of the laminate was subjected to a corona discharge treatment, and an acrylic pressure-sensitive adhesive was coated onto the treated surface. Thus, a pressure-sensitive adhesive tape to be used for evaluation was obtained.

Examples 1 to 29 & Comparative Examples 1 to 18

By using the components and blend ratios shown in Tables 1 to 12, pressure-sensitive adhesive tapes having the layer structures as shown in Tables 1 to 12 were produced, and their physical properties were evaluated. The results are shown in Tables 1 to 12.

In the Tables, the layer structure "PE(2)-1/fabric/PE(2)-2/adhesive" denotes the structure of "polyethylene layer (2)-1/fabric layer/polyethylene layer (2)-2/pressure-sensitive adhesive layer".

TABLE 1

| | | | | | Example 1 | Example 2 | Example 3 | Example 4 |
|---|---|---|---|---|---|---|---|---|
| Layer structure | Component A | MFR | | (g/10 min) | 8 | 18 | 18 | 18 |
| | | Density | | (g/m$^3$) | 0.898 | 0.898 | 0.898 | 0.898 |
| | | Tem | | (°C.) | 100 | 100 | 100 | 100 |
| | Component B | MFR | | (g/10 min) | 4 | 4 | 4 | 4 |
| | | Density | | (g/m$^3$) | 0.92 | 0.92 | 0.92 | 0.92 |
| | Weight ratio | Component A:Component B | | | 95:5 | 75:25 | 40:60 | 25:75 |
| | Component A + Component B | MFR | | (g/10 min) | 17 | 13 | 9 | 5 |
| | | Density | | (g/m$^3$) | 0.900 | 0.904 | 0.910 | 0.915 |
| | Layer structure of tape | PE(2)-1/fabric/PE(2)-2/adhesive | | (μm) | 45/30 | 45/30 | 45/30 | 45/30 |
| | Thicknesses of polyethylene layers | (2)-1/(2)-2 | | | | | | |
| Evaluation | Tear strength | (kgf) | | lengthwise | untearable | untearable | untearable | untearable |
| | | | | crosswise | 0.3 | 0.37 | 0.45 | 0.52 |
| | Heat-sealing strength | (kgf/15 mm) | | lengthwise | 3.8 | 3.5 | 2.8 | 2.4 |
| | Bending resistance | (mm) | | crosswise | 45.5 | 51.2 | 58.0 | 60.3 |
| | Tensile strength | (kgf) | | lengthwise | 31.7 | 33.4 | 36.5 | 37.9 |
| | | | | crosswise | 35.4 | 37.0 | 40.7 | 40.6 |
| | Tensile elongation | (%) | | lengthwise | 16.7 | 16.3 | 15.2 | 15.8 |
| | | | | crosswise | 16.8 | 16.3 | 15.2 | 15.4 |
| | Processability Processing speed | :100 m/min | | | ○ | ○ | ○ | ○ |
| | | :20 m/min | | | ○ | ○ | ○ | ○ |
| | Anti-blocking properties | | | | ○ | ○ | ○ | ○ |

TABLE 2

| | | | | | Example 5 | Example 6 | Comp. Example 1 |
|---|---|---|---|---|---|---|---|
| Layer structure | Component A | MFR | | (g/10 min) | 18 | 18 | — |
| | | Density | | (g/m$^3$) | 0.898 | 0.898 | — |
| | | Tem | | (°C.) | 100 | 100 | — |
| | Component B | MFR | | (g/10 min) | — | 4 | 4 |

TABLE 2-continued

|  |  |  |  | Example 5 | Example 6 | Comp. Example 1 |
|---|---|---|---|---|---|---|
|  |  | Density | (g/m³) | — | 0.92 | 0.92 |
|  | Weight ratio | Component A:Component B |  | 100:0 | 15:85 | 0:100 |
|  | Component A + Component B | MFR | (g/10 min) | 18 | 5 | 4 |
|  |  | Density | (g/m³) | 0.898 | 0.916 | 0.92 |
|  | Layer structure of tape | PE(2)-1/fabric/PE(2)-2/adhesive | (μm) | 45/30 | 45/30 | 45/30 |
|  | Thicknesses of polyethylene layers | (2)-1/(2)-2 |  |  |  |  |
| Evaluation | Tear strength | (kgf) | lengthwise | untearable | untearable | untearable |
|  |  |  | crosswise | 0.3 | 0.65 | 0.72 |
|  | Heat-sealing strength | (kgf/15 mm) | lengthwise | 3.9 | 1.2 | 1 |
|  | Bending resistance | (mm) | crosswise | 43.2 | 63.0 | 64.8 |
|  | Tensile strength | (kgf) | lengthwise | 30.8 | 38.5 | 39.9 |
|  |  |  | crosswise | 34.2 | 40.1 | 39.7 |
|  | Tensile elongation | (%) | lengthwise | 16.8 | 16.2 | 16.8 |
|  |  |  | crosswise | 16.8 | 16.3 | 16.0 |
|  | Processability Processing speed | :100 m/min |  | × | ○ | ○ |
|  |  | :20 m/min |  | ○ | ○ | ○ |
|  | Anti-blocking properties |  |  | — | ○ | ○ |

TABLE 3

|  |  |  |  | Comp. Example 2 | Example 7 | Example 8 | Example 9 | Example 10 |
|---|---|---|---|---|---|---|---|---|
| Layer structure | Component A | MFR | (g/10 min) | 0.05 | 0.5 | 18 | 80 | 120 |
|  |  | Density | (g/m³) | 0.898 | 0.898 | 0.898 | 0.898 | 0.898 |
|  |  | Tem | (°C.) | 100 | 100 | 100 | 100 | 100 |
|  | Component B | MFR | (g/10 min) | 4 | 4 | 4 | 4 | 4 |
|  |  | Density | (g/m³) | 0.92 | 0.92 | 0.92 | 0.92 | 0.92 |
|  | Weight ratio | Component A:Component B |  | 40:60 | 40:60 | 40:60 | 40:60 | 40:60 |
|  | Component A + Component B | MFR | (g/10 min) | 0.3 | 1.2 | 9 | 13 | 16 |
|  |  | Density | (g/m³) | 0.910 | 0.910 | 0.910 | 0.910 | 0.910 |
|  | Layer structure of tape | PE(2)-1/fabric/PE(2)-2/adhesive | (μm) | 45/30 | 45/30 | 45/30 | 45/30 | 45/30 |
|  | Thicknesses of polyethylene layers | (2)-1/(2)-2 |  |  |  |  |  |  |
| Evaluation | Tear strength | (kgf) | lengthwise | — | untearable | untearable | untearable | untearable |
|  |  |  | crosswise | — | 0.49 | 0.45 | 0.32 | 0.30 |
|  | Heat-sealing strength | (kgf/15 mm) | lengthwise | — | 3.1 | 2.8 | 2.2 | 1.9 |
|  | Bending resistance | (mm) | crosswise | — | 60.1 | 58.0 | 53.3 | 50.2 |
|  | Tensile strength | (kgf) | lengthwise | — | 37.1 | 36.5 | 35.8 | 34.7 |
|  |  |  | crosswise | — | 40.9 | 40.7 | 40.2 | 39.3 |
|  | Tensile elongation | (%) | lengthwise | — | 15.6 | 15.2 | 15.1 | 15.4 |
|  |  |  | crosswise | — | 15.4 | 15.2 | 15.0 | 15.2 |
|  | Processability Processing speed | :100 m/min |  | × | ○ | ○ | ○ | × |
|  |  | :20 m/min |  | × | ○ | ○ | ○ | ○ |
|  | Anti-blocking properties |  |  | — | ○ | ○ | ○ | × |

TABLE 4

|  |  |  |  | Example 11 | Example 12 | Example 13 | Example 14 | Comp. Example 3 |
|---|---|---|---|---|---|---|---|---|
| Layer structure | Component A | MFR | (g/10 min) | 18 | 18 | 18 | 18 | 18 |
|  |  | Density | (g/m³) | 0.865 | 0.875 | 0.898 | 0.910 | 0.917 |
|  |  | Tem | (°C.) | 73 | 82 | 100 | 111 | 118 |
|  | Component B | MFR | (g/10 min) | 4 | 4 | 4 | 4 | 4 |
|  |  | Density | (g/m³) | 0.92 | 0.92 | 0.92 | 0.92 | 0.92 |
|  | Weight ratio | Component A:Component B |  | 40:60 | 40:60 | 40:60 | 40:60 | 40:60 |
|  | Component A + Component B | MFR | (g/10 min) | 9 | 9 | 9 | 9 | 9 |
|  |  | Density | (g/m³) | 0.898 | 0.902 | 0.910 | 0.916 | 0.919 |
|  | Layer structure of tape | PE(2)-1/fabric/PE(2)-2/adhesive | (μm) | 45/30 | 45/30 | 45/30 | 45/30 | 45/30 |
|  | Thicknesses of polyethylene layers | (2)-1/(2)-2 |  |  |  |  |  |  |
| Evaluation | Tear strength | (kgf) | lengthwise | untearable | untearable | untearable | untearable | untearable |
|  |  |  | crosswise | 0.37 | 0.4 | 0.45 | 0.47 | 0.5 |
|  | Heat-sealing strength | (kgf/15 mm) | lengthwise | 2.4 | 2.8 | 2.8 | 3.0 | 3.1 |
|  | Bending resistance | (mm) | crosswise | 50.3 | 54.7 | 58.0 | 61.5 | 64.7 |
|  | Tensile strength | (kgf) | lengthwise | 34.5 | 35.6 | 36.5 | 37.5 | 37.9 |
|  |  |  | crosswise | 38.04 | 39.2 | 40.7 | 41.1 | 41.8 |
|  | Tensile elongation | (%) | lengthwise | 15.0 | 15.1 | 15.2 | 15.1 | 15.3 |
|  |  |  | crosswise | 14.9 | 15.4 | 15.2 | 15.0 | 15.1 |

TABLE 4-continued

|  |  |  | Example 11 | Example 12 | Example 13 | Example 14 | Comp. Example 3 |
|---|---|---|---|---|---|---|---|
| Processability Processing speed | | :100 m/min | ○ | ○ | ○ | ○ | ○ |
| | | :20 m/min | ○ | ○ | ○ | ○ | ○ |
| Anti-blocking properties | | | × | ○ | ○ | ○ | ○ |

TABLE 5

| | | | | Example 15 | Example 16 | Example 17 | Example 18 | Comp. Example 4 | Comp. Example 5 |
|---|---|---|---|---|---|---|---|---|---|
| Layer structure | Component A | MFR | (g/10 min) | 18 | 18 | 18 | 18 | 18 | 18 |
| | | Density | (g/m³) | 0.860 | 0.867 | 0.898 | 0.910 | 0.920 | 0.860 |
| | | Tem | (°C.) | 53 | 75 | 100 | 111 | 120 | 53 |
| | Component B | MFR | (g/10 min) | 4 | 4 | 4 | 4 | 4 | 4 |
| | | Density | (g/m³) | 0.92 | 0.92 | 0.92 | 0.92 | 0.92 | 0.92 |
| | Weight ratio | Component A:Component B | | 40:60 | 40:60 | 40:60 | 40:60 | 40:60 | 80:20 |
| | Component A + Component B | MFR | (g/10 min) | 9 | 9 | 9 | 9 | 9 | 14 |
| | | Density | (g/m³) | 0.896 | 0.899 | 0.910 | 0.916 | 0.920 | 0.873 |
| | Layer structure of tape | PE(2)-1/fabric/PE(2)-2/adhesive | (μm) | 45/30 | 45/30 | 45/30 | 45/30 | 45/30 | 45/30 |
| | Thicknesses of polyethylene layers | (2)-1/(2)-2 | | | | | | | |
| Evaluation | Tear strength | (kgf) | lengthwise | untearable | untearable | untearable | untearable | untearable | untearable |
| | | | crosswise | 0.36 | 0.39 | 0.45 | 0.47 | 0.51 | 0.35 |
| | Heat-sealing strength | (kgf/15 mm) | lengthwise | 2.2 | 2.5 | 2.8 | 3.0 | 3.2 | 2.1 |
| | Bending resistance | (mm) | crosswise | 48.2 | 52.6 | 58.0 | 61.5 | 65.5 | 42.3 |
| | Tensile strength | (kgf) | lengthwise | 34.8 | 35.0 | 36.5 | 37.5 | 38.0 | 35.1 |
| | | | crosswise | 37.5 | 38.5 | 40.7 | 41.1 | 42.1 | 38.3 |
| | Tensile elongation | (%) | lengthwise | 14.8 | 15.1 | 15.2 | 15.1 | 15.2 | 15.4 |
| | | | crosswise | 14.8 | 15.2 | 15.2 | 15.0 | 15.1 | 15.2 |
| | Processability Processing speed | | :100 m/min | ○ | ○ | ○ | ○ | ○ | × |
| | | | :20 m/min | ○ | ○ | ○ | ○ | ○ | ○ |
| | Anti-blocking properties | | | × | ○ | ○ | ○ | ○ | × |

TABLE 6

| | | | | Comp. Example 6 | Example 19 | Example 20 | Comp. Example 7 | Comp. Example 8 |
|---|---|---|---|---|---|---|---|---|
| Layer structure | Component A | MFR | (g/10 min) | 18 | 18 | 18 | 18 | 18 |
| | | Density | (g/m³) | 0.898 | 0.898 | 0.898 | 0.898 | 0.898 |
| | | Tem | (°C.) | 100 | 100 | 100 | 100 | 100 |
| | Component B | MFR | (g/10 min) | 0.05 | 0.5 | 4 | 40 | 60 |
| | | Density | (g/m³) | 0.92 | 0.92 | 0.92 | 0.92 | 0.92 |
| | Weight ratio | Component A:Component B | | 40:60 | 40:60 | 40:60 | 40:60 | 40:60 |
| | Component A + Component B | MFR | (g/10 min) | 0.4 | 2 | 9 | 29 | 37 |
| | | Density | (g/m³) | 0.910 | 0.910 | 0.910 | 0.910 | 0.910 |
| | Layer structure of tape | PE(2)-1/fabric/PE(2)-2/adhesive | (μm) | — | 45/30 | 45/30 | 45/30 | — |
| | Thicknesses of polyethylene layers | (2)-1/(2)-2 | | | | | | |
| Evaluation | Tear strength | (kgf) | lengthwise | — | untearable | untearable | untearable | untearable |
| | | | crosswise | — | 0.48 | 0.45 | 0.38 | 0.41 |
| | Heat-sealing strength | (kgf/15 mm) | lengthwise | — | 3.0 | 2.8 | 2.5 | 1.9 |
| | Bending resistance | (mm) | crosswise | — | 59.4 | 58.0 | 56.2 | 54.8 |
| | Tensile strength | (kgf) | lengthwise | — | 35.9 | 36.5 | 35.3 | 31.3 |
| | | | crosswise | — | 41.4 | 40.7 | 40.5 | 33.5 |
| | Tensile elongation | (%) | lengthwise | — | 15.1 | 15.2 | 15.5 | 15.6 |
| | | | crosswise | — | 15.1 | 15.2 | 15.4 | 15.7 |
| | Processability Processing speed | | :100 m/min | × | ○ | ○ | ○ | × |
| | | | :20 m/min | × | ○ | ○ | ○ | ○ |
| | Anti-blocking properties | | | — | ○ | ○ | ○ | × |

TABLE 7

|  |  |  |  | Example 21 | Example 22 | Example 23 | Example 24 | Comp. Example 9 |
|---|---|---|---|---|---|---|---|---|
| Layer structure | Component A | MFR | (g/10 min) | 18 | 18 | 18 | 18 | 18 |
|  |  | Density | (g/m³) | 0.898 | 0.898 | 0.898 | 0.898 | 0.898 |
|  |  | Tem | (°C.) | 100 | 100 | 100 | 100 | 100 |
|  | Component B | MFR | (g/10 min) | 4 | 4 | 4 | 4 | 4 |
|  |  | Density | (g/m³) | 0.910 | 0.917 | 0.92 | 0.93 | 0.942 |
|  | Weight ratio | Component A:Component B |  | 40:60 | 40:60 | 40:60 | 40:60 | 40:60 |
|  | Component A + Component B | MFR | (g/10 min) | 9 | 9 | 9 | 9 | 9 |
|  |  | Density | (g/m³) | 0.905 | 0.909 | 0.910 | 0.917 | 0.924 |
|  | Layer structure of tape Thicknesses of polyethylene layers | PE(2)-1/fabric/PE(2)-2/adhesive (2)-1/(2)-2 | (μm) | 45/30 | 45/30 | 45/30 | 45/30 | 45/30 |
| Evaluation | Tear strength | (kgf) |  | lengthwise | untearable | untearable | untearable | untearable | untearable |
|  |  |  |  | crosswise | 0.42 | 0.44 | 0.45 | 0.38 | 0.31 |
|  | Heat-sealing strength | (kgf/15 mm) |  | lengthwise | 2.6 | 2.8 | 2.8 | 3.0 | 3.2 |
|  | Bending resistance | (mm) |  | crosswise | 55.0 | 57.0 | 58.0 | 62.5 | 72.4 |
|  | Tensile strength | (kgf) |  | lengthwise | 36.7 | 36.2 | 36.5 | 37.1 | 37.8 |
|  |  |  |  | crosswise | 40.4 | 40.5 | 40.7 | 40.8 | 42.0 |
|  | Tensile elongation | (%) |  | lengthwise | 15.6 | 15.1 | 15.2 | 14.7 | 14.5 |
|  |  |  |  | crosswise | 15.3 | 15.1 | 15.2 | 14.8 | 14.5 |
|  | Processability Processing speed | :100 m/min |  |  | ○ | ○ | ○ | ○ | ○ |
|  |  | :20 m/min |  |  | ○ | ○ | ○ | ○ | ○ |
|  | Anti-blocking properties |  |  |  | × | ○ | ○ | ○ | ○ |

TABLE 8

|  |  |  |  | Example 25 | Example 26 | Comp. Example 10 |
|---|---|---|---|---|---|---|
| Layer structure | Component A | MFR | (g/10 min) | 18 | 18 | — |
|  |  | Density | (g/m³) | 0.898 | 0.898 | — |
|  |  | Tem | (°C.) | 100 | 100 | — |
|  | Component B | MFR | (g/10 min) | 4 | 4 | 4 |
|  |  | Density | (g/m³) | 0.92 | 0.92 | 0.92 |
|  | Weight ratio | Component A:Component B |  | 75:25 | 40:60 | 0:100 |
|  | Component A + Component B | MFR | (g/10 min) | 13 | 9 | 4 |
|  |  | Density | (g/m³) | 0.904 | 0.910 | 0.92 |
|  | Layer structure of tape Thicknesses of polyethylene layers | PE(2)-1/fabric/PE(2)-2/adhesive (2)-1/(2)-2 | (μm) | 0/40 | 0/40 | 0/40 |
| Evaluation | Tear strength | (kgf) | lengthwise | untearable | untearable | untearable |
|  |  |  | crosswise | 0.70 | 0.72 | 1.80 |
|  | Heat-sealing strength | (kgf/15 mm) | lengthwise | — | — | — |
|  | Bending resistance | (mm) | crosswise | 53.7 | 59.7 | 64.2 |
|  | Tensile strength | (kgf) | lengthwise | 36.1 | 38.7 | 38.4 |
|  |  |  | crosswise | 38.0 | 40.0 | 39.9 |
|  | Tensile elongation | (%) | lengthwise | 15.3 | 15.5 | 15.3 |
|  |  |  | crosswise | 16.2 | 16.5 | 16.7 |
|  | Processability Processing speed | :100 m/min |  | ○ | ○ | ○ |
|  |  | :20 m/min |  | ○ | ○ | ○ |
|  | Anti-blocking properties |  |  | ○ | ○ | ○ |

TABLE 9

|  |  |  |  | Example 27 | Example 28 | Example 29 | Example 30 |
|---|---|---|---|---|---|---|---|
| Layer structure | Component A | MFR | (g/10 min) | 18 | 18 | 18 | 18 |
|  |  | Density | (g/m³) | 0.898 | 0.898 | 0.898 | 0.898 |
|  |  | Tem | (°C.) | 100 | 100 | 100 | 100 |
|  | Component B | MFR | (g/10 min) | 4 | 4 | 4 | 4 |
|  |  | Density | (g/m³) | 0.92 | 0.92 | 0.92 | 0.92 |
|  | Weight ratio | Component A:Component B |  | 75:25 | 40:60 | 75:25 | 40:60 |
|  | Component A + Component B | MFR | (g/10 min) | 13 | 9 | 13 | 9 |
|  |  | Density | (g/m³) | 0.904 | 0.904 | 0.904 | 0.910 |
|  | Layer structure of tape Thicknesses of polyethylene layers | PE(2)-1/fabric/PE(2)-2/adhesive (2)-1/(2)-2 | (μm) | 30/30 | 30/30 | 35/30 | 35/30 |
| Evaluation | Tear strength | (kgf) | lengthwise | untearable | untearable | untearable | untearable |
|  |  |  | crosswise | 0.77 | 0.77 | 0.62 | 0.62 |
|  | Heat-sealing strength | (kgf/15 mm) | lengthwise | — | — | — | — |
|  | Bending resistance | (mm) | crosswise | 49.2 | 52.7 | 49.8 | 54.5 |
|  | Tensile strength | (kgf) | lengthwise | 37.3 | 40.9 | 34.5 | 38.2 |
|  |  |  | crosswise | 38.0 | 40.5 | 37.3 | 41.5 |
|  | Tensile elongation | (%) | lengthwise | 16.0 | 16.5 | 15.2 | 15.3 |

TABLE 9-continued

|  |  |  |  | Example 27 | Example 28 | Example 29 | Example 30 |
|---|---|---|---|---|---|---|---|
|  |  |  | crosswise | 17.7 | 16.0 | 17.5 | 15.5 |
|  | Processability Processing speed | :100 m/min |  | ○ | ○ | ○ | ○ |
|  |  | :20 m/min |  | ○ | ○ | ○ | ○ |
|  | Anti-blocking properties |  |  | ○ | ○ | ○ | ○ |

TABLE 10

|  |  |  |  | Comp. Example 11 | Comp. Example 12 |
|---|---|---|---|---|---|
| Layer structure | Component A | MFR | (g/10 min) | — | — |
|  |  | Density | (g/m³) | — | — |
|  |  | Tem | (°C.) | — | — |
|  | Component B | MFR | (g/10 min) | 4 | 4 |
|  |  | Density | (g/m³) | 0.92 | 0.92 |
|  | Weight ratio | Component A:Component B |  | 0:100 | 0:100 |
|  | Component A + Component B | MFR | (g/10 min) | 4 | 4 |
|  |  | Density | (g/m³) | 0.92 | 0.92 |
|  | Layer structure of tape | PE(2)-1/fabric/PE(2)-2/adhesive | (μm) | 30/30 | 35/30 |
|  | Thicknesses of polyethylene layers | (2)-1/(2)-2 |  |  |  |
| Evaluation | Tear strength | (kgf) | lengthwise | untearable | untearable |
|  |  |  | crosswise | 1.17 | 1.03 |
|  | Heat-sealing strength | (kgf/15 mm) | lengthwise | — | — |
|  | Bending resistance | (mm) | crosswise | 58.8 | 61.3 |
|  | Tensile strength | (kgf) | lengthwise | 40.6 | 38.0 |
|  |  |  | crosswise | 39 | 41.5 |
|  | Tensile elongation | (%) | lengthwise | 16 | 15 |
|  |  |  | crosswise | 15.3 | 15.2 |
|  | Processability Processing speed | :100 m/min |  | ○ | ○ |
|  |  | :20 m/min |  | ○ | ○ |
|  | Anti-blocking properties |  |  | ○ | ○ |

TABLE 11

|  |  |  |  | Example 31 | Example 32 | Example 33 | Example 34 |
|---|---|---|---|---|---|---|---|
| Layer structure | Component A | MFR | (g/10 min) | 18 | 18 | 18 | 18 |
|  |  | Density | (g/m³) | 0.898 | 0.898 | 0.898 | 0.898 |
|  |  | Tem | (°C.) | 100 | 100 | 100 | 100 |
|  | Component B | MFR | (g/10 min) | 4 | 4 | 4 | 4 |
|  |  | Density | (g/m³) | 0.92 | 0.92 | 0.92 | 0.92 |
|  | Weight ratio | Component A:Component B |  | 75:25 | 40:60 | 75:25 | 40:60 |
|  | Component A + Component B | MFR | (g/10 min) | 13 | 9 | 13 | 9 |
|  |  | Density | (g/m³) | 0.904 | 0.910 | 0.904 | 0.910 |
|  | Layer structure of tape | PE(2)-1/fabric/PE(2)-2/adhesive | (μm) | 40/30 | 40/30 | 45/30 | 45/30 |
|  | Thicknesses of polyethylene layers | (2)-1/(2)-2 |  |  |  |  |  |
| Evaluation | Tear strength | (kgf) | lengthwise | untearable | untearable | untearable | untearable |
|  |  |  | crosswise | 0.42 | 0.53 | 0.37 | 0.45 |
|  | Heat-sealing strength | (kgf/15 mm) | lengthwise | — | — | 3.5 | 2.8 |
|  | Bending resistance | (mm) | crosswise | 50.5 | 55.5 | 51.2 | 58.0 |
|  | Tensile strength | (kgf) | lengthwise | 35.0 | 36.0 | 33.4 | 36.5 |
|  |  |  | crosswise | 41.6 | 40.7 | 37.0 | 40.7 |
|  | Tensile elongation | (%) | lengthwise | 16.3 | 14.8 | 16.3 | 15.2 |
|  |  |  | crosswise | 17.7 | 14.5 | 16.3 | 15.2 |
|  | Processability Processing speed | :100 m/min |  | ○ | ○ | ○ | ○ |
|  |  | :20 m/min |  | ○ | ○ | ○ | ○ |
|  | Anti-blocking properties |  |  | ○ | ○ | ○ | ○ |

TABLE 12

|  |  |  |  | Comp. Example 13 | Comp. Example 14 |
|---|---|---|---|---|---|
| Layer structure | Component A | MFR | (g/10 min) | — | — |
|  |  | Density | (g/m³) | — | — |
|  |  | Tem | (°C.) | — | — |
|  | Component B | MFR | (g/10 min) | 4 | 4 |
|  |  | Density | (g/m³) | 0.92 | 0.92 |
|  | Weight ratio | Component A:Component B |  | 0:100 | 0:100 |
|  | Component A + Component B | MFR | (g/10 min) | 4 | 4 |
|  |  | Density | (g/m³) | 0.92 | 0.92 |
|  | Layer structure of tape | PE(2)-1/fabric/PE(2)-2/adhesive | (μm) | 40/30 | 45/30 |

TABLE 12-continued

|  |  |  |  | Comp. Example 13 | Comp. Example 14 |
|---|---|---|---|---|---|
|  | Thicknesses of polyethylene layers | (2)-1/(2)-2 |  |  |  |
| Evaluation | Tear strength | (kgf) | lengthwise | untearable | untearable |
|  |  |  | crosswise | 0.9 | 0.72 |
|  | Heat-sealing strength | (kgf/15 mm) | lengthwise | — | 1 |
|  | Bending resistance | (mm) | crosswise | 63.5 | 64.8 |
|  | Tensile strength | (kgf) | lengthwise | 37.0 | 39.9 |
|  |  |  | crosswise | 40.1 | 39.7 |
|  | Tensile elongation | (%) | lengthwise | 15.5 | 16.8 |
|  |  |  | crosswise | 15.3 | 16.0 |
|  | Processability Processing speed | :100 m/min |  | ○ | ○ |
|  |  | :20 m/min |  | ○ | ○ |
|  | Anti-blocking properties |  |  | ○ | ○ |

What is claimed is:

1. A pressure-sensitive adhesive tape which is a laminate comprising:

(1) a woven fabric layer whose warp and weft are thermoplastic-resin-made flat yarns, (2) a layer of polyethylene having a density (D) of 0.875 to 0.917 kg/cm$^3$ and an MFR of 1 to 25 g/10 min, laminated to one surface or both surfaces of the woven fabric layer, and (3) a pressure-sensitive adhesive layer laminated to the polyethylene layer (2), wherein the laminate fulfills the following relationship:

$$W \leq -0.03T + 2.4$$

in which T represents the thickness ($\mu$m) of the polyethylene layer, and W represents the tear strength (kg) of the pressure-sensitive adhesive tape in the crosswise direction thereof.

2. The pressure-sensitive adhesive tape according to claim 1, wherein the polyethylene layer (2) is made from a composition comprising the following Component A and Component B:

Component A: 20 to 99% by weight of a copolymer of ethylene with an alpha-olefin having 3 to 18 carbon atoms, produced by using a metallocene catalyst, having the following properties <1> and <2>:

<1> an MFR of 0.1 to 100 g/10 min, and

<2> a density (D) of 0.870 to 0.915 g/cm$^3$; and

Component B: 80 to 1% by weight of high-pressure low-density polyethylene having the following properties <1> and <2>:

<1> an MFR of 0.1 to 50 g/10 min, and

<2> a density (D) of 0.915 to 0.940 g/cm$^3$.

3. The pressure-sensitive adhesive tape according to claim 2, wherein the copolymer of ethylene with an alpha-olefin having 3 to 18 carbon atoms is produced by the use of a metallocene catalyst, the extrapolated melting-termination temperature (Tem) of the copolymer is in the range of 55 to 115° C., and the Tem and the density (D) of the copolymer fulfills the following relationship:

$$Tem \leq 286D - 137$$

* * * * *